Figure 1:
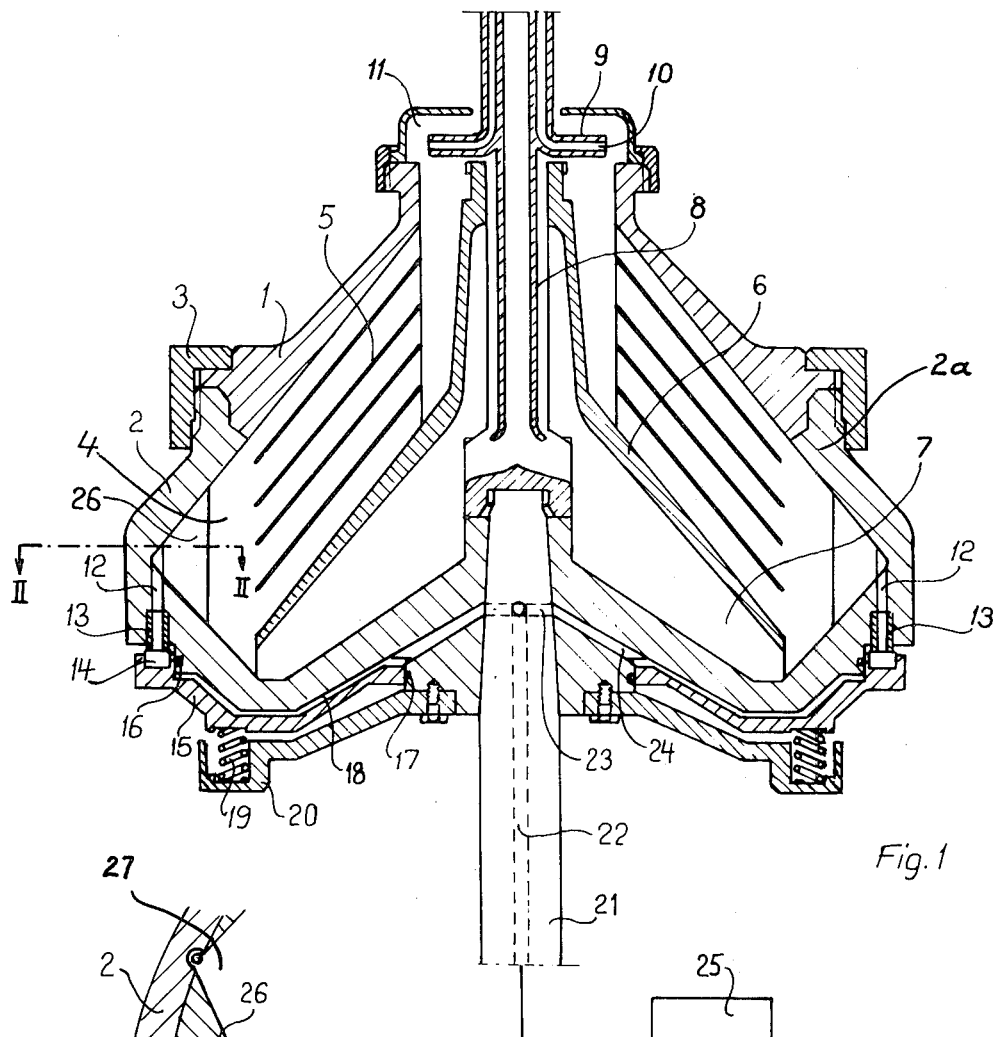

United States Patent [19]

Thylefors

[11] 4,015,773
[45] Apr. 5, 1977

[54] CENTRIFUGE FOR SEPARATING SOLIDS FROM LIQUIDS

[75] Inventor: Henric Wilhelm Thylefors, Stockholm, Sweden

[73] Assignee: Alfa-Laval AB, Tumba, Sweden

[22] Filed: Jan. 27, 1976

[21] Appl. No.: 652,754

[30] Foreign Application Priority Data

Feb. 4, 1975  Sweden ............................ 7501189

[52] U.S. Cl. ............................................ 233/20 A
[51] Int. Cl.² ........................................ B04B 1/14
[58] Field of Search ............ 223/19 R, 19 A, 20 R, 223/20 A, 27, 46, 47 R; 233/20 R, 20 A, 46, 47 R

[56] References Cited

UNITED STATES PATENTS

| 3,125,516 | 3/1964 | Kaldewey | 233/47 R |
| 3,403,849 | 10/1968 | Thylefors | 233/20 R |
| 3,460,750 | 8/1969 | Silla | 233/20 R |
| 3,462,076 | 8/1969 | Steinacker | 233/20 R |

FOREIGN PATENTS OR APPLICATIONS

| 822,975 | 11/1951 | Germany | 233/20 A |
| 1,214,228 | 12/1970 | United Kingdom | 233/20 A |
| 365,450 | 1/1932 | United Kingdom | 233/20 R |
| 1,166,859 | 10/1969 | United Kingdom | 233/20 A |

Primary Examiner—George H. Krizmanich
Attorney, Agent, or Firm—Cyrus S. Hapgood

[57] ABSTRACT

A centrifugal rotor having peripheral outlets for intermittent sludge discharge includes two axially united and interconnected parts forming between them the separating chamber. One of the rotor parts is a bowl formed in one piece and provided with an edge portion directed radially inward, the other rotor part having a substantially smaller diameter than the bowl part and being connected therewith at said edge portion. The portion of the bowl part surrounding the separating chamber, and including said edge portion, has a form which, as seen in an axial section through the rotor, is substantially the axial section form of a hollow conical body.

4 Claims, 3 Drawing Figures

U.S. Patent  April 5, 1977  4,015,773

CENTRIFUGE FOR SEPARATING SOLIDS FROM LIQUIDS

The present invention relates to a centrifugal separator of the type in which the rotor comprises two axially united and interconnected parts forming between them a separating chamber, the rotor having a central inlet for a mixture of liquid and solid particles, a central outlet for separated liquid, and several peripheral outlets for separated solid particles, the last-mentioned outlets being constituted by channels extending through the rotor body from the radially outermost part of the separating chamber to the outside of the rotor body. A separator of this type also has means arranged to be displaced axially during operation to and from sealing contact against the outside of the rotor body around the peripheral outlet channels, the sealing surfaces of said means and the outside parts of the rotor body surrounding the outlet channels being arranged so that the sealing is effected by a sealing force acting substantially parallel to the rotor axis.

A centrifugal separator of this kind is disclosed in German Pat. No. 582,587 issued in the year 1931.

At the end of the nineteenth century, the continuously operating centrifugal separator was invented. Originally, it had a rotor with an unbroken surrounding wall, i.e., there were no peripheral outlets for solid particles separated in the rotor. At the beginning of the twentieth century, the so-called nozzle separator was invented, the rotor of which is provided with narrow outlet openings at its periphery, through which separated solid particles are thrown out during the operation of the separator. Later, various valve means were invented for enabling intermittent opening of the peripheral outlet openings of nozzle separators during operations. One valve means of this kind is shown in the above-mentioned German Pat. No. 582,587. Valve means of this kind were desired because the peripheral outlet openings thereby could be made larger, and in this way clogging thereof could be avoided. About the year 1930, there was invented a centrifugal separator of the kind used today. A centrifugal separator of this kind is characterized in that the rotor is provided with a number of peripheral outlet openings which can be closed and opened during operation by means of an annular slide arranged to be brought into sealing abutment against the rotor body radially inside the peripheral outlet openings. A centrifugal separator of this kind is shown, for instance, in German Pat. No. 652,292 issued in 1934.

Since the last-mentioned invention was made, substantially all development in the field of centrifugal separators, concerning intermittent discharge of solid particles separated in the centrifuge rotor, has proceeded within the scope of that invention. The so-called nozzle separator with continuous discharge of separated solid particles during operation has been developed along with the new kind of centrifugal separator but has become less and less important. The largest part of the market has been taken over by centrifugal separators with intermittently opening peripheral outlets for separated solid particles.

Since the development of centrifugal separators started, there has been a constant desire for improved separation efficiency. This desire has been especially concerned with centrifugal separators having intermittently opening peripheral outlets for separated solid particles, and it has been fulfilled by different means. One such means has been making the centrifugal separators larger, another means being the use of higher speeds of rotation. Serious problems as to strength have been encountered, however, and these problems to a large extent have been caused by the principle of construction of centrifugal separators with an internal annular slide arranged to be brought into sealing contact against the centrifuge rotor body radially inside its peripheral outlet openings for separated solid particles.

The present invention involves a departure from the development course followed during the last forty years concerning centrifugal separators with intermittently opening peripheral outlets for separated solid particles, and it aims at fulfilling the desire for better separation efficiency without obstacles due to the conventional problems as to strength.

The invention is characterized for this purpose in that a centrifugal separator of the initially described kind, which has been known since at least the year 1931, is modified so that one part of the rotor is constituted by a bowl formed in one piece and provided with a radially inwardly directed edge portion, the other part of the rotor having a substantially smaller diameter than the bowl-formed rotor part and being connected therewith at its said edge portion, the surrounding portion of the bowl-formed rotor part, including said edge portion, having a form which, as seen in an axial section through the rotor, is substantially like the axial section form of a hollow conical body.

By this invention, it is possible to form a centrifuge rotor, of the kind having means for intermittent opening of peripheral outlets during operation, in a favorable manner seen from the technical strength point of view, so that at least twice as large centrifugal forces as before may be achieved within the separating chamber without change of the diameter of the centrifuge rotor. It has thus proved possible in practice to obtain a centrifugal force of about 13,000 g, in contrast to about 6,000 g for conventional centrifugal separators having the same diameter and intermittently opening peripheral outlets.

It has also proved possible by the invention to remove from the centrifuge rotor, during operation, separated solid particles having a dry substance content higher than that previously obtainable. This is believed to be due to the fact that a substantially higher pressure can be obtained now than previously within the radially outermost part of the separating chamber. Owing to the resulting pressure difference between this part of the separating chamber and the atmosphere surrounding the rotor, such large shearing forces will be obtained in the mass of the separated solid particles within the separating chamber, when the peripheral outlets of the rotor are opened, that the particles can flow out through the relatively small outlets in spite of the fact that the particle mass has a very large dry substance content.

It has been possible also by means of previously known centrifugal separators, having intermittently opening peripheral outlets, to obtain a high dry substance content of a particle mass within the separating chamber, this result being accomplished by causing the separation to go on for a relatively long time. It has not been possible, however, to discharge a firmly compressed mass of particles thus obtained through the relatively small outlets in the surrounding wall of the rotor. Therefore, it has generally been necessary to accept a substantially lower dry substance content of the particle mass discharged from the centrifuge rotor than the one really desired.

An important consequence of the invention is that centrifugal separators with intermittently opening peripheral outlets can now be given a substantially more simple construction than previously. Because the peripheral outlets of the centrifuge rotor may be made relatively small, the force influencing the operating means due to the pressure of the content of the separating chamber, and which must be overcome when said outlets are to be closed, is relatively small. The arrangement necessary for providing this closing force, and for removal of the same, may therefore be given small dimensions. A centrifugal separator according to the invention may thus be made more simple and less expensive and yet more effective than previous centrifugal separators with intermittently opening peripheral outlets.

In a preferred embodiment of the invention, the radially inwardly directed edge portion of the bowl-formed rotor part has an inner diameter that is slightly larger than the outer diameter of the conical disc set normally arranged within the separating chamber. In this way the rotor body may be given the most favorable form, seen from the technical strength point of view, and still the disc set may be mounted within the rotor in the most simple manner.

Figure 2:
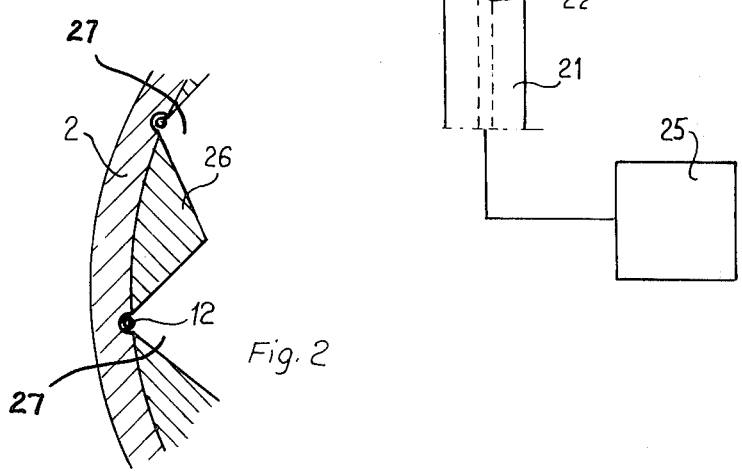

The invention is further described with reference to the accompanying drawing, in which FIG. 1 is a vertical sectional view of a centrifugal separator constructed according to the invention, and FIG. 2 is a sectional view along the line II — II in FIG. 1.

As shown in FIG. 1, the centrifuge rotor comprises two parts 1 and 2 which are held together by means of a lock ring 3. The rotor defines a separating chamber 4 in which a conical disc set 5 is arranged. Within the rotor there are also a conical distributor 6 having radial distributor wings 7, and a stationary inlet pipe 8 extending into the distributor. The inlet pipe 8 supports on its outside a paring disc 9 with paring channels 10 opening into an outlet chamber 11 for separated liquid.

From the radially outermost parts of the separating chamber 4 a number of channels 12 extend parallel to the rotor axis through the lower rotor part 2. In the openings of the channels 12 at the outside of the rotor are small sleeves 13 which extend some distance downward from the outside of the rotor body. Small members 14 for closing the openings of the sleeves 13 (and thereby the openings of the channels 12) are fastened on an annular plate 15 arranged concentrically with the rotor axis, and movable axially relative to the rotor. Annular sealing members 16 and 17 are arranged so that a substantially closed space 18, extending around the rotor axis, is confined between the plate 15 and the lower part 2 of the rotor. The space 18 remains substantially closed also during axial movement of the plate 15 relative to the rotor part 2. The plate 15 is pressed towards the rotor part 2 by means of a large number of springs 19 supported by plate 20 connected with the rotor part 2.

The entire rotor is supported by a rotatable shaft 21 having an axial channel 22. This channel 22 communicates at its upper end through several crossing channels 23 in the shaft 21, and through the same number of channels 24 in the rotor part 2, with the space 18 between the plate 15 and the rotor part 2. The channel 22 also communicates with a device 25 arranged to supply pressurized air intermittently to the channel 22 and thus subject the space 18 to overpressure.

As shown in FIG. 2, the separating chamber contains filler pieces 26 located at the periphery of the rotor part 2. These filler pieces form together with the rotor part 2 funnel-shaped pockets 27 in the separating chamber, the chamber 12 extending from the radially outermost parts of these pockets.

In the operation of the centrifugal separator, liquid containing particles to be separated is supplied into the centrifuge rotor through the inlet pipe 8, from which it flows in the distributor 6 between the distributor wings 7 and thence into the separating chamber 4. In the latter, the solid particles are separated by the centrifugal force and are collected in the funnel-shaped pockets between the filler pieces 26 (FIG. 2), while liquid freed from particles flows toward the axis of the rotor to the outlet chamber 11 and thence from the rotor via the paring channels 10.

When separated solid particles are to be removed from the separating chamber 4 after a certain period of time, the device 25 is activated so that the channels 22-24 and the space 18 are subjected for a short moment to overpressure. The plate 15 is thus forced away from the rotor part 2 against the action of the springs 19, whereby the channels 12 are opened. Due to the high pressure prevailing within the separating chamber 4 as a consequence of the rotation of the rotor, separated solid particles are forced out from the rotor through the channels 12. The particles are thrown by the centrifugal force away from the openings of the sleeves 13 without coming into contact with the outside of the rotor.

As soon as the pressure in the channels 22-24 and the space 18 returns to normal (generally atmospheric pressure), the plate 15 is pressed by springs 19 back to its starting position where the members 14 close the openings of the sleeves 13.

Of course, a sludge-sensing device of a known type (not shown) may be provided for automatically sensing when the centrifuge rotor must be emptied of separated solid particles. In that case, the sensing device would be arranged to separate automatically, in a conventional manner, the above-mentioned device 25 for the supply of pressurized air to the channels 22-24 and the space 18.

The cross-sectional area of the channels 12 may be varied with regard to the kind of solid particles to be separated in the centrifugal separator. For instance, when yeast particles are to be separated in connection with production of beer, it has proved suitable to use channels 12 having a diameter of about 10 mm. Further, the filler pieces 26 may be formed with regard to the kind of particles to be separated. The angle formed by the funnel-forming surfaces of the filler pieces with a radius of the centrifuge rotor is thus chosen with regard to the relevant angle of repose for the separated particles.

With the above-described centrifugal separator, pressurized air is used for opening the channels 12. If desired, liquid could be used, of course, as the pressure fluid. A number of throttled drainage channels would then have to extend from the radially outermost part of the space 18. The device 25 in such a case need not generate any substantial pressure by itself. Owing to the centrifugal force obtained by the presence of liquid within the space 18, there would automatically be created a necessary pressure for forcing the plate 15 away from the rotor part 2.

If desired, the present invention may be used with centrifugal separators of the kind comprising constantly open nozzles at the periphery of the centrifuge rotor. During operation of centrifugal separators of this kind, a high viscosity mass of separated particles is continuously removed from the separating chamber through these nozzles. In certain cases it has proved desirable to provide the rotor of such a centrifugal separator with further outlets for separated solid particles. These outlets should normally be closed but should be opened intermittently for rapid removal of an excess of particles separated in the separating chamber. An arrangement of this kind, comprising continuously open outlets as well as intermittently opened outlets, may be used for preventing an excessive increase in the particle concentration of the particle mass leaving the separating chamber through the constantly open outlets.

The intermittently opening outlets may be constituted by peripheral outlets 12 according to the present invention. Because of the simplicity of the construction shown in the drawing, these outlets may be opened and closed with high frequency without substantial wear of the centrifuge rotor and without substantial reduction of the speed of rotation of the centrifuge rotor in connection with the opening actions.

The intermittently opening outlets are preferably situated farthest from the axis of rotation in the separating chamber, while the inlet parts of the constantly open nozzzle channels are situated somewhat radially inside the intermittently opening outlets in the separating chamber. This prevents the nozzle channels, which are very narrow, from being clogged by large solid particles present in the centrifuged liquid. Preferably, the inlet parts of the nozzle channels are directed so that they turn their openings radially outwards, i.e., away from the rotor axis. Clogging of the nozzle channels in this way may be practically avoided.

As will be noted from FIG. 1, the rotor part 2 is constituted by a bowl formed in one piece and provided with an upper edge portion 2a directed radially inward. The other rotor part 1 has a substantially smaller outer diameter than the bowl part 2 and is connected thereto at the edge portion 2a by means of the locking ring 3.

As shown, the edge portion 2a has an inner diameter slightly larger than the outer diameter of the disc set 5.

I claim:

1. A centrifugal separator comprising a rotor mounted for rotation about an axis and including two axially united and interconnected parts forming between them a separating chamber, the rotor having a central inlet for a mixture of liquid and solid particles and having a central outlet for separated liquid, the rotor also having several peripheral outlets being constituted by channels extending through the rotor from the radially outermost part of the separating chamber to the outside of the rotor body, each said channel having a discharge opening at the outside of the rotor body, means movable axially to and from sealing contact with the outside of the rotor body to close and open said channels, said means including areas which, when in sealing contact with the outside of the rotor body, exert on opposite sides of each discharge opening a sealing force substantially parallel to the rotor axis, one of said rotor parts being constituted by a bowl formed in one piece and provided with an edge portion directed radially inward, the other rotor part having a substantially smaller diameter than the bowl part and being connected therewith at said edge portion, the chamber-surrounding portion of the bowl part, including said edge portion, having a form which, as seen in an axial section through the rotor, is substantially the axial section form of a hollow conical body.

2. A centrifugal separator according to claim 1, comprising also a conical disc set in the separating chamber, said inwardly directed edge portion having an inner diameter slightly larger than the outer diameter of the disc set.

3. A centrifugal separator according to claim 1, wherein each said channel extends substantially parallel to the rotor axis, as seen in an axial section through the rotor, and opens outside the rotor through an annular surface thereof which extends substantially perpendicular to the rotor axis and which is positioned for engagement by one of said areas of said axially movable means.

4. A centrifugal separator according to claim 1, in which said areas, when in sealing contact with the outside of the rotor body, exert completely around each discharge opening a sealing force substantially parallel to the rotor axis.

* * * * *